United States Patent
Walker et al.

(10) Patent No.: US 8,400,025 B2
(45) Date of Patent: Mar. 19, 2013

(54) APPARATUS AND METHOD FOR MOTOR DRIVEN APPLIANCE ENERGY CONSERVATION

(76) Inventors: Erik Keith Walker, Aurora, CO (US); James Lee Elliott, Denver, CO (US)

( * ) Notice: Subject to any disclaimer, the term of this patent is extended or adjusted under 35 U.S.C. 154(b) by 190 days.

(21) Appl. No.: 12/658,961

(22) Filed: Feb. 17, 2010

(65) Prior Publication Data
US 2010/0207460 A1    Aug. 19, 2010

Related U.S. Application Data

(60) Provisional application No. 61/207,835, filed on Feb. 18, 2009.

(51) Int. Cl.
*G05F 1/70* (2006.01)

(52) U.S. Cl. ......... 307/109; 307/154; 323/205; 323/364

(58) Field of Classification Search ............... 307/109, 307/154; 323/205, 364
See application file for complete search history.

(56) References Cited

U.S. PATENT DOCUMENTS

| | | | | |
|---|---|---|---|---|
| 3,916,309 A * | 10/1975 | Foulkes et al. | ............. | 324/103 P |
| 4,042,865 A * | 8/1977 | Gurwicz | ................... | 388/806 |
| 4,513,237 A * | 4/1985 | Ford | ................. | 318/768 |
| 4,636,702 A * | 1/1987 | Hedges | .................. | 318/729 |
| 4,730,118 A * | 3/1988 | Quarles et al. | ............. | 290/40 R |
| 5,224,029 A * | 6/1993 | Newman, Jr. | ................... | 363/48 |
| 5,488,269 A * | 1/1996 | El-Hamamsy et al. | ....... | 315/307 |
| 5,742,103 A * | 4/1998 | Ashok | .......................... | 307/105 |
| 6,847,853 B1 * | 1/2005 | Vinciarelli et al. | ............. | 700/97 |
| 6,888,709 B2 * | 5/2005 | Princinsky et al. | ............. | 361/47 |
| 7,782,009 B2 * | 8/2010 | Wiseman | ..................... | 318/801 |
| 7,804,280 B2 * | 9/2010 | Deaver et al. | ................. | 323/210 |
| 2007/0085517 A1 * | 4/2007 | Ribarich et al. | ............. | 323/235 |
| 2007/0279015 A1 * | 12/2007 | Livingston et al. | ........... | 323/209 |
| 2008/0106241 A1 * | 5/2008 | Deaver et al. | ................. | 323/209 |
| 2010/0037189 A1 * | 2/2010 | Bickel | .............................. | 716/4 |
| 2010/0091423 A1 * | 4/2010 | Johnson | ......................... | 361/118 |
| 2010/0246218 A1 * | 9/2010 | Decraemer | ...................... | 363/37 |
| 2011/0149446 A1 * | 6/2011 | Moreira | .......................... | 361/30 |
| 2012/0008355 A1 * | 1/2012 | Kravitz | ........................... | 363/126 |

\* cited by examiner

*Primary Examiner* — Adi Amrany

(57) ABSTRACT

An apparatus and method for substantially reducing the electrical energy consumption of a.c. induction motor-driven appliances by connecting a database predetermined capacitance in parallel with the motor-driven appliances and connecting a database predetermined inductance in series with the a.c. induction motor-driven appliances to effect the optimal power factor correction and optimal inrush current limiting of such motor-driven appliances thereby conserving electrical energy and reducing electrical energy costs. The databases of the present invention which specify the optimal power factor correction capacitance value and an optimal inductance value for specific a.c. induction motor-driven appliances eliminates the need for preliminary power factor and inrush current related electrical measurements and making the mass production and sale of the present invention practical.

14 Claims, 8 Drawing Sheets

POWER TRIANGLE FOR COMPLEX LOADS

CAPACITANCE VS. HORSEPOWER GRAPH

CAPACITANCE VS. HORSEPOWER GRAPH

DATABASE BASED SALES PROCESS

APPARATUS AND METHOD FOR MOTOR DRIVEN APPLIANCE ENERGY CONSERVATION

The following patent application is a continuation of provisional patent application with U.S. application number U.S. 61/207,835, filing date Feb. 18, 2009, entitled "Apparatus and Method for Appliance Power Factor Optimization," by applicants Erik Keith Walker of Aurora, Colo. and James Lee Elliott of Denver, Colo.

BACKGROUND OF THE INVENTION

1. Field of the Invention

The present invention relates to a method and apparatus for reducing the electrical power consumed by motor-driven appliances. More specifically, the present invention relates to a method and apparatus for optimizing the power factor of a.c. induction motor-driven appliances and reducing the inrush current associated with their operation. More specifically still, the present invention relates to a method and apparatus that optimizes the power factor of plug-in motor-driven appliances such as refrigerators, freezers, window air conditioners, clothes washing machines, or clothes dryers and hard-wired motor-driven appliances such as furnace blowers, central air conditioners, well-water pumps, and the like, while simultaneously reducing the inrush current of such motor-driven appliances.

2. Background of the Invention

In industrialized nations, motor-driven appliances typically found in residential units are ubiquitous and are also found in churches, schools, restaurants, and a myriad of small businesses. Many millions of such motor-driven appliances have been mass produced and collectively consume megawatts of electrical power annually. In contrast, the tools, equipment, and systems typically found in various industries are highly specialized and collectively they consume significantly less electrical power annually than motor-driven appliances.

Typically, motor-driven appliances are ultimately connected to a power transformer via conductors that may be several hundred feet in length. Another several tens of feet of conductors may extend from a circuit breaker panel to such motor-driven appliances within residential units, churches, schools, and small business buildings. Thus, several hundred feet of conductors may intervene between motor-driven appliances and the power transformers supplying electric power to them. The direct current, hereafter "DC", resistance of said conductors dissipates the alternating current, hereafter "AC", electrical current flowing to the house as Real Power which is the basis of residential monthly utility company charges. Since Real Power varies as the square of the magnitude of electrical current, reducing the magnitude of the average electrical current flowing through said conductors significantly reduces that house's monthly utility bill.

Specifically, most houses contain several $1/8^{th}$ to 8 horsepower AC induction motor-driven appliances that perform a variety of essential functions for its occupants. The AC induction motors of such motor-driven appliances are of the following types:
1. Split-Phase Motors.
2. Capacitor Split-Phase Motors.
3. Permanent Split-Phase Motors.

Such motors are relatively inexpensive, simple to construct, reliable, and have a reasonably long operating life. Furthermore, they are sufficiently powerful to perform a wide variety of utilitarian tasks, e.g. driving compressors for the refrigeration of foods, circulating the air, and so on.

However, such motors are relatively inefficient with respect to their ability to convert electrical power into mechanical power. Such motors are characterized as inductive loads which cause the voltage at the motor terminals to be substantially out-of-phase with the current flowing through the motors. Consequently, such motors operate inefficiently and draw more electrical current from the local utility company than is necessary resulting in unnecessarily large monthly utility bills. Furthermore, collectively, such motors in the households of the world's industrialized nations waste megawatts of electrical power annually.

The energy efficiency of such motors may be optimized by connecting a suitable capacitance in parallel with such motors to form a resonant circuit in which motor voltage and current are aligned while simultaneously drawing a minimum of current from the utility company. That is, such motors may be power factor corrected where power factor is defined as the ratio of the real power consumed by such motors divided by the apparent power. PF is a real number between 0.0 and 1.00 while the power factor of such motors is typically ranges between 0.45 and 0.70. By convention, optimal power factor correction of such motors is considered to be a power factor greater than, or equal to, 0.95.

The energy efficiency of such motors can be further improved by limiting their inrush current. Each and every time such motors are switched on, they draw 6 to 10 times their rated Full Load Ampere (FLA) current for about one second which is called inrush current. A typical household motor-driven appliance may turn on, and off, more than 1440 times per month drawing 6 to 10 times their rated FLA for more than 20 minutes. Collectively, the five or six typical household motor-driven appliances could draw 6 to 10 their FLA for about 100 to 120 minutes each month. As stated above, the real power dissipated in the conductors that connect motor-driven appliances to a distant power transformer increases as the square of the current magnitude. Thus, limiting inrush current will significantly reduce the average energy consumption of residential units en masse while reducing energy costs, i.e. utility bills.

3. PRIOR ART

Prior art inventions relied upon a preliminary, trial and error, multi-step power factor sizing procedure to determine a residential unit's overall power factor. More specifically, the first step in the prior art sizing procedure necessitated switching the motor-driven appliances of the residential unit under test into a particular on/off configuration assumed to be either a "worst case" scenario or a "typical" scenario. For example, a worst case scenario is usually considered to be one in which all household motor-driven appliances are switched on. For another example, a typical scenario may be one in which the refrigerator and central air conditioner are switched on while all other motor-driven appliances are switched off.

In the second prior art step, a switched capacitor bank box is connected in parallel with the residential unit's 208-230 VAC power mains and a suitable digital multi-meter is connected thereto to measure the residential unit's power factor. In the third prior art step, the switches of the switched capacitor bank box are toggled to switch various combinations of capacitors in, and out, of parallel electrical connection with the residential unit's power mains and reading the resulting power factor on the digital multi-meter. By trial and error, the switched capacitor bank box switches are toggled until the power factor is optimized, i.e. equal to, or greater than, 0.95. In the next prior art step, the capacitance that power factor optimized the overall residential unit is recorded. The next prior art step consists of manufacturing a custom power factor correcting device for that particular residential unit. The final step in the prior art is actually installing the power factor correcting device on, or in, the residential unit under test.

However, as can be seen, the prior art suffers from many drawbacks. First, it is predicated upon an assumed and unrealistic on/off configuration of a residential unit's motor-driven appliances. That is, the power factor of residential units as seen from their power mains changes over a wide range of values as various motor-driven appliances are automatically and/or manually turned on and off over time. Consequently, is that the capacitance of the installed power factor correction device seldom, if ever, optimizes the residential unit's power factor. Thus, the energy conserving and energy cost saving capabilities of the prior art are inherently and severely limited.

A second prior art drawback is its trial and error, convoluted, and time-consuming, sizing procedure that necessitates travel to each residential unit where the prior art is to be deployed. It is estimated that the U.S. is host to some 178 million households. Clearly, travel to each and every one of these 178 million households and executing the sizing procedure of the prior art is impractical. Consequently, the commercial success of the prior art has been inherently and severely limited. A third prior art drawback is its requirement that a licensed electrician must install each and every one of its instances as they are connected to the power mains of residential units. A fourth prior art drawback is its dependence upon a limited number of special, expensive, awkward to operate, switched capacitor bank boxes.

Clearly, there is a need for a residential unit power factor correction invention that maintains the residential unit's power factor at optimal levels regardless of the on/off configuration of its motor-driven appliances resulting in maximum energy conservation and energy cost savings possible. Clearly, there is a need for a residential unit power factor correction invention that can be mass produced and practically sold to the global market without execution of the sizing procedure of the prior art.

SUMMARY OF THE INVENTION

Accordingly, an object of the present invention to power factor correct the AC induction motors of the principal household motor-driven appliances such as refrigerators, freezers, central air conditioners, window air conditioners, swamp coolers, heat pumps, furnace blowers, clothes washers, clothes dryers, pool pumps, spa pumps, well-water pumps, and the like, based solely upon the appliance type, motor type, and motor horsepower. The present invention utilizes a database that relates the appliance type, motor type, and motor horsepower to a predetermined capacitance value which optimally power factor corrects the AC induction motor under consideration, thereby eliminating the need for a trial and error sizing procedure.

Another object of the present invention is to limit the inrush current of the AC induction motors of the principal household motor-driven appliances such as refrigerators, freezers, central air conditioners, window air conditioners, swamp coolers, heat pumps, furnace blowers, clothes washers, clothes dryers, pool pumps, spa pumps, well-water pumps, and the like, based solely upon the appliance type, motor type and motor horsepower. As stated above, the present invention utilizes a database that relates the appliance type, motor type, and motor horsepower to a predetermined inductance value required to suitably limit the inrush current of such motors.

Another object of the present invention is to connect an instance of the present invention to each principal household motor-driven appliance such that power factor correction is effected only when those motor-driven appliances that are switched on and are otherwise inactive. Thus, the residential unit's power factor is consistently maintained within an optimal range and is unaffected by the randomly changing on/off configuration of a household's principal motor-driven appliances.

Another object of the present invention is to eliminate the need for expensive, awkward to use, switched capacitor bank boxes to determine the capacitance required to power factor correct residential units. The present invention eliminates the need for switched capacitor bank boxes by creating a database of motor-driven appliances that relates motor type and motor horsepower to a capacitance value required for optimum power factor correction.

Finally, an object of the present invention is to create an efficient and practical sales process in which instances of the present invention are mass produced, sold by conventional means, and installed by consumers and licensed electricians on principal household motor-driven appliances on the basis of appliance type, motor type, and motor horsepower, just as computer printer cartridges are currently sold and installed.

BRIEF DESCRIPTION OF THE DRAWINGS

The invention, together with the other objects, features, aspects, and advantages thereof will be more clearly understood from the following in conjunction with the accompanying drawings.

DETAILED DESCRIPTION OF THE PREFERRED EMBODIMENTS

Figure 1:
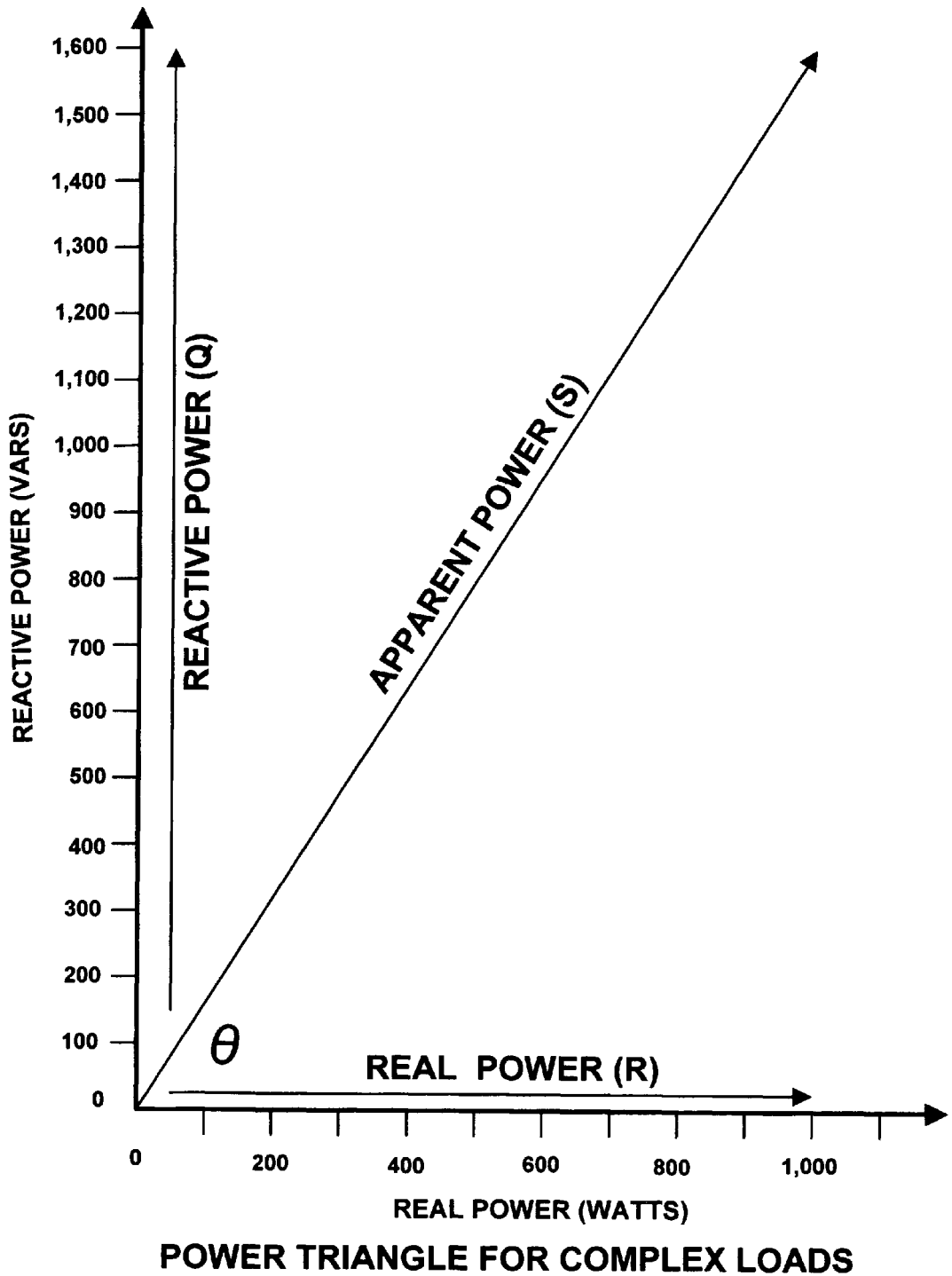
FIG. 1. is a Power Triangle that illustrates real power (R), apparent power (S), reactive power (Q), and power factor angle, theta, between the apparent power vector (S) and the real power vector (R).

FIG. 1. is a Power Triangle that graphically shows the relationship between real power (R), apparent power (S), and reactive power (Q) for a complex impedance. As stated above, power factor is defined as the ratio of real power to apparent power and is a real number between 0 and 1. Alternatively, power factor is the cosine of the angle, theta, between the apparent power vector and the real power vector. Note that real power, measured in watts (W), is the projection of the apparent power vector, measured in volt-ampere (VA), onto the x-axis. Similarly, note that reactive power (Q), measured in volt-ampere-reactive (VARs), is the projection of the apparent power vector onto the y-axis.

The Appliance Type/Motor Type/Motor Horsepower/-to-Capacitance Database of the present invention is created by execution of the following procedure:

1. Measuring the voltage (V), current (I), and either real power (R) or the power factor (PF), of a wide variety of principal household motor-driven appliances while they operate.
2. Reading the "nameplate" of the house motor-driven appliance under test to determine the horsepower of the principal motor of the motor-driven appliance. For example, the principal motor of a refrigerator is the refrigeration compressor motor.
3. Computing the apparent power (S) by multiplying the measured voltage (V) and (I) as follows:

$S = VI$ (Volt-Amperes)

4. Computing power factor (PF) by dividing real power (R) by apparent power (S) as follows:

$$PF = \frac{R}{S}.$$

5. Computing the power factor angle theta (θ) as follows:

$\cos(\theta) = PF$ $\theta = \arccos(PF)$

6. Computing reactive power (Q) as follows:

$Q = S \sin(\theta)$ $= I^2 X_L$

7. Computing the motor-driven appliance's inductive impedance ($X_L$) as follows:

$$X_L = \frac{Q}{I^2}$$

8. Equating the inductive impedance ($X_L$) to the capacitance impedance ($X_c$) of the capacitance of the present invention that is to be connected in parallel with the motor-driven appliance under test to form a parallel resonance circuit therewith, as follows:

$$X_C = X_L$$

$$X_L = \frac{1}{2\pi FC}$$

9. Solving for the capacitance value (C) in farads that will form a resonance circuit with the motor-driven appliance under test as follows:

$$C = \frac{1}{2\pi F X_L}$$

The above computational procedure can be automated and computerized with commonly available software programs, e.g. Excel or Matlab. The above mentioned database of the present invention enables the mass production of specific embodiments of the present invention that are specifically designed for specific types of motor-driven appliances, with specific types of motors, of specific horsepower ratings. Furthermore, the above mentioned database of the present invention makes the commercial sale of large numbers of instances of the present invention practical as it eliminates the need for "sizing" measurements at each and every deployment site of the present invention.

Figure 2:
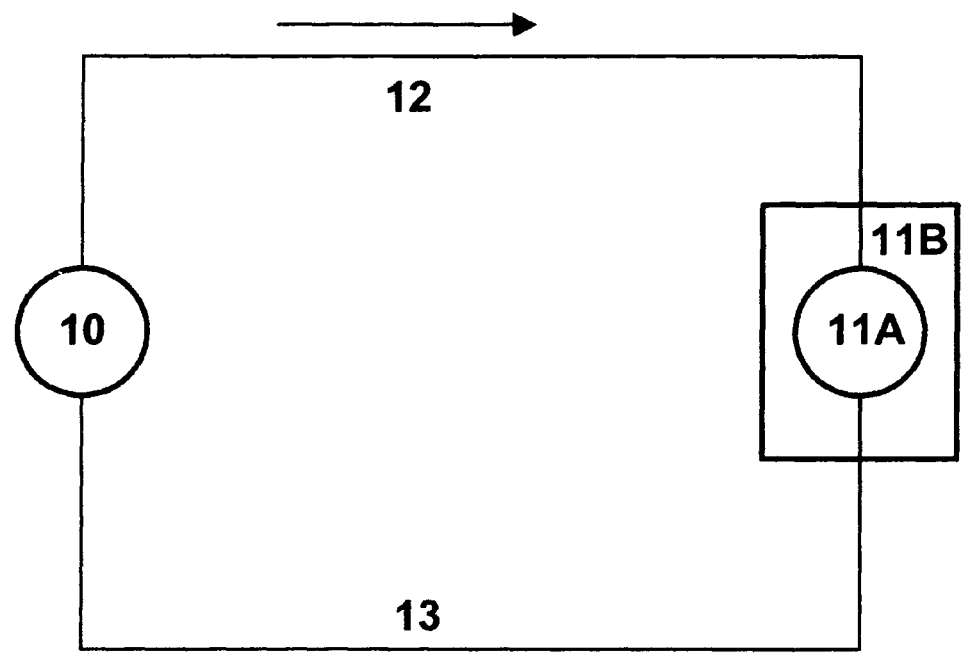
FIG. 2. is a circuit diagram of a single phase AC induction motor connected to an AC power source such as the mains of a house or building accessible via the house's AC power receptacles or circuit breaker panel box.

FIG. 2. shows how the vast majority of AC power transformers 10 are connected to the AC induction motors 11A of principal household motor-driven appliances. The AC induction motors 11A located within motor-driven appliances 11B and connected directly to a utility AC power transformer 10 via a substantial length of conductors 12 and 13 that extend from the utility AC power transformer through the residential unit's circuit breaker panel and ultimately to the AC power receptacles of plug-in principal household motor-driven appliances and to the hard-wired motor-driven appliances. Unfortunately, most AC induction motors 11A are relatively inefficient and operate with power factors in the 0.45 to 0.70 range. Under these conditions, the AC induction motors 11A will draw significantly more current from the utility AC power transformer 10 via conductors 12 and 13 than a motor that is power factor optimized would draw. Furthermore, there is no means to limit the inrush current of the AC induction motor 11A of the motor-driven appliance 11B when it is repeatedly and numerously switched on over the typical monthly bill cycle. As stated above, the inrush current of an AC induction motor such as 11A may be 6 to 10 times greater than the motor's Full Load Amperage, for as long as one second Thus, most motor-driven appliances 11B waste a significant amount of electrical energy.

Figure 3:
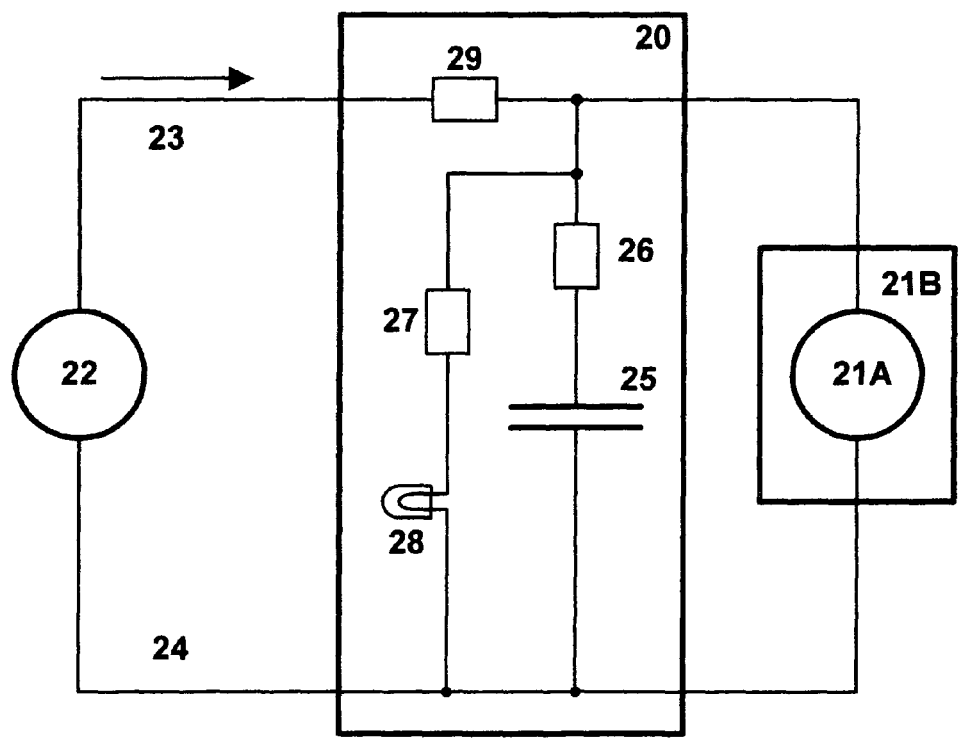
FIG. 3. is a circuit diagram of a single phase AC induction motor with a power factor correction capacitance module of the present invention connected in parallel with the motor to optimizes its power factor.

FIG. 3. shows how the present invention 20 may be utilized to optimize the power factor of the AC induction motor 21A within a typical motor-driven appliance 21B while simultaneously limiting the AC induction motor's 21A inrush current. These objectives are accomplished by connecting the present invention to utility AC power transformer 22 via conductors 23 and 24 thereby connecting the capacitance 25 and over current protection device 26 in parallel with motor-driven appliance 21B. The capacitance 25 of the present invention 20 is specifically predetermined to have a capacitive impedance equal to the inductive impedance of the motor-driven appliance 21B at the power line frequency, e.g. 50 Hz or 60 Hz, which characterizes parallel resonance circuits. As is widely known, the magnitude of the current in the parallel circuit is a maximum while the impedance of the parallel resonance circuit is a maximum. As a result, a parallel resonance circuit draws the minimum of electrical current from an AC power source, i.e. the utility AC power transformer 22. At resonance, the magnitude of the current flowing through AC induction motor 21A is undiminished from its value in the circuit diagramed in FIG. 2. while the current drawn by the combination of the present invention 20 and the motor-driven appliance 21B decreases to a minimum value. Since the real power dissipated in conductors 23 and 24 varies as the square of the magnitude of the current flowing them, significantly decreasing the magnitude of current substantially decreases the real power dissipated in conductors 23 and 24 thereby conserving electrical energy and reducing electrical energy costs, i.e. reducing utility bills.

The present invention 20 also employs an overcurrent protection device 26 such as a fuse or circuit breaker that will open-circuit if the current through capacitance 25 rises above a predetermined threshold value as might be the case in lightning strike transient voltage surge scenarios. If overcurrent protection device 26 open-circuits, current will flow through resistor 27 and a luminous light source 28 such as an incandescent light bulb or LED to alert consumers to the fact that it is no longer operative. Alternatively, luminous light source 28 may be replaced by, or made to operate in concert with, an audible alarm (not shown) that periodically "chirps" like a smoke detector with low battery power. Thus, the present invention provides a visual and/or audible indication that it is no longer operative and should be replaced.

Figure 4B:
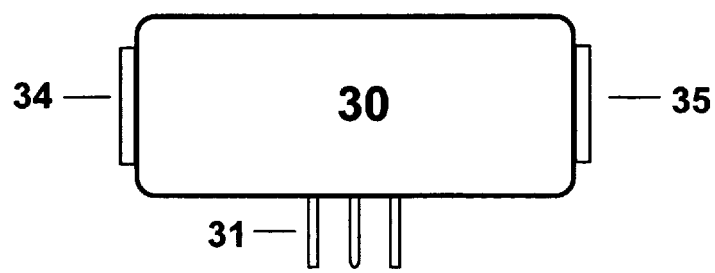
FIG. 4. is a front view orthogonal projection drawing of the first embodiment of the present invention that plugs into a 120 VAC power receptacle and is provided with side 120 VAC receptacles to accommodate the power cord plug of a 120 VAC motor-driven appliance to substantially power factor correct it.
Figure 4A:
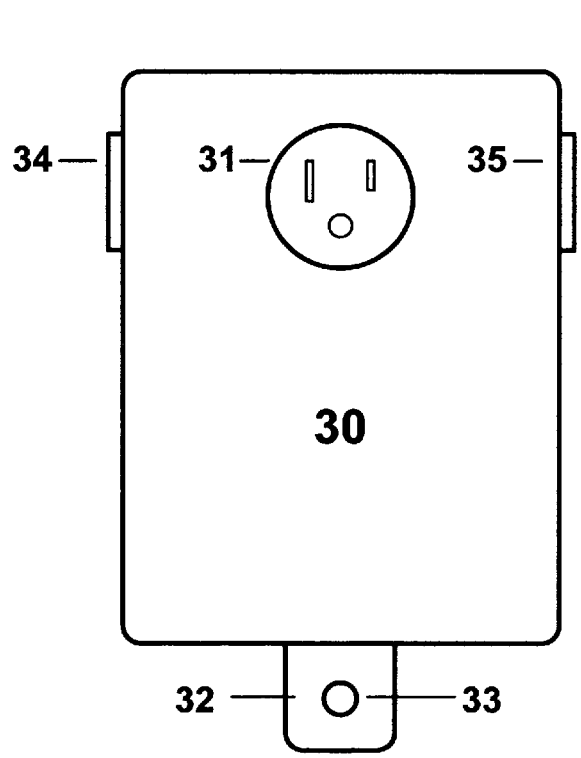
Figure 4C:
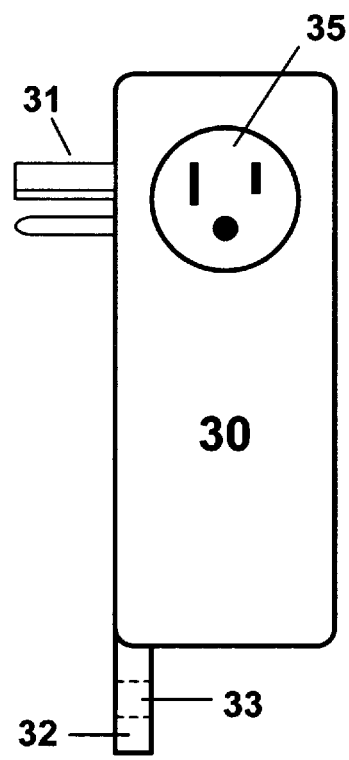

FIG. 4A., 4B., and 4C., is a rear view orthogonal projection of the first embodiment of the present invention 30 that is designed to reduce the energy consumption of 120 VAC motor-driven appliances such as refrigerators. FIG. 4A. is a rear view of the first embodiment of the present invention depicting a 15 amp, 120 VAC plug 31 that inserts into a 120 VAC receptacle and is secured by attaching mounting flange 32 to the wall beneath the 120 VAC receptacle with a suitable fastener inserted into hole 33 in mounting flange 32. However, the plug 31 may be of the 20 amp, 120 VAC type. The first embodiment is also provided with a visual alarm light 36 on the front surface of the present invention 30 (not visible in FIG. 4A) that illuminates when the unit is inoperative and should be replaced. Preferably, visual alarm light 36 is red in color. Furthermore, the first embodiment of the present invention 30 may also, or instead, be provided with an audible alarm annunciator 37 sounds when the present invention malfunctions, is no longer operative, and should be replaced. FIG. 4B. is a top view of the first embodiment of the present invention 30 illustrating the "low profile" or thin enclosure design that enabling it to be deployed behind a 120 VAC motor-driven appliance such as a refrigerator, freezer, or clothes washing machine where space is not in abundance. FIG. 4B. also depicts two side 120 VAC receptacles 34 and 35 that are so located as to enable the insertion of a 120 VAC power cord plug of a 120 VAC motor-driven appliance into one of the receptacles 34 or 35 to minimize the protrusion of such 120 VAC power cord plugs from the wall behind such 120 VAC motor-driven appliances. FIG. 4C. is a right side view of the present invention 30 depicting 120 VAC plug 31, one side 120 VAC receptacle 35, and mounting flange 32.

To understand the operation of the first embodiment of the present invention 30 please refer to FIG. 3 and FIGS. 4A, 4B, and 4C. Once the 120 VAC plug 31 of FIG. 4C. has been inserted into a 120 VAC receptacle and the mounting flange 32 has been securely attached to a wall with a suitable fastener inserted through hole 33, a 120 VAC power cord plug of 120 VAC motor-driven appliance is inserted into one of the two side 120 VAC receptacles 34 or 35 with the following results. First, the 120 VAC motor-driven appliance is electrically connected to 120 VAC power through the electrical conductors of the present invention 30 so that it may operate. Second, the 120 VAC motor-driven appliance is electrically connected in parallel with capacitance 25 of FIG. 3. with a capacitance value that has been predetermined to substantially power factor correct the 120 VAC motor-driven appliance electrically connected to the present invention 30. Preferably, the present invention 30 will correct the power factor of the 120 VAC motor-driven appliance to greater than, or equal to, 0.95. Third, the 120 VAC motor-driven appliance is electrically connected in series with reactor filter 29 with an inductance value that has been predetermined to substantially limit the inrush current of the 120 VAC motor-driven appliance electrically connected to the present invention 30. As a result, the 120 VAC motor-driven appliance electrically connected to the present invention 30 of FIGS. 4A, 4B, and 4C. consumes less electrical energy during start up and in steady-state operation which is the primary objective of the present invention 30.

Figure 5B:
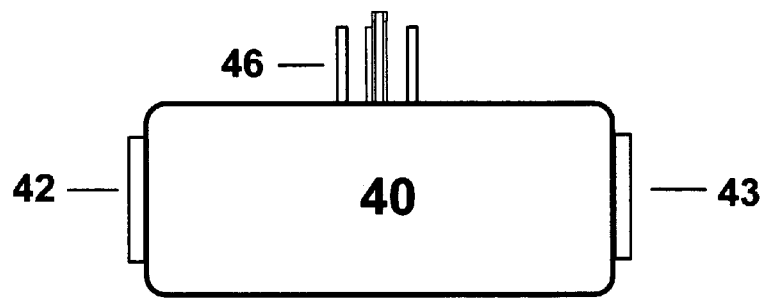
FIG. 5. is a rear view orthogonal projection drawing of the second embodiment of the present invention that plugs into a 208-230 VAC power receptacle and is provided with side 208-230 VAC receptacles to accommodate the power cord plug of a 208-230 VAC motor-driven appliance to substantially power factor correct it. The third embodiment of the present invention (not shown) is exactly like the second embodiment except that it is provided with a three prong, 208-230 VAC plug and three prong, 208-230 VAC receptacles.
Figure 5A:
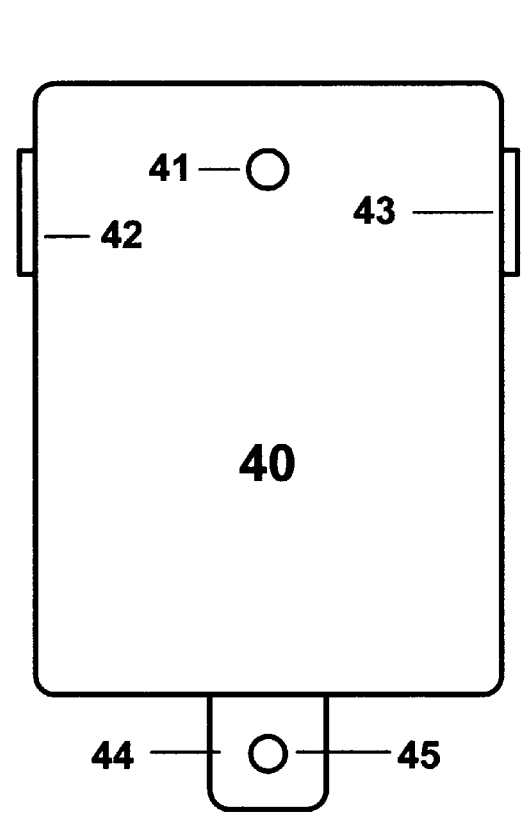
Figure 5C:
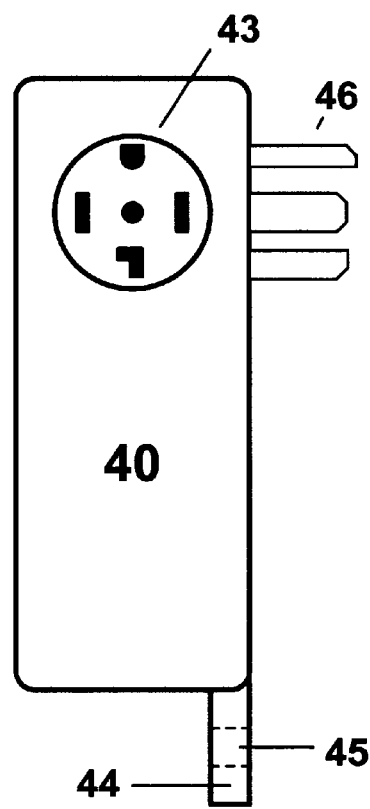

FIG. 5A, 5B, and 5C, is a front view orthogonal projection of the second embodiment of the present invention 40 that operates in a manner that is very similar to the first embodiment of the present invention depicted in FIGS. 4A, 4B, and 4C. except that it is designed to reduce the electrical power consumption of four prong, 208-230 VAC motor-driven appliances such as clothes dryers. FIG. 5A is a front view of the second embodiment of the present invention depicting visual alarm light 41 that illuminates when the unit is inoperative and should be replaced. The second embodiment of the present invention 40 may also, or instead, be provided with an audible alarm annunciator 47 (not shown) that sounds when the unit is inoperative and should be replaced. The weight and size of 208-230 VAC four conductor power cords necessitates securing the mounting flange 44 to the wall beneath the 208-230 VAC receptacle with a suitable fastener inserted through mounting flange hole 45. FIG. 5B. is a top view of the second embodiment of the present invention showing the "low profile" or thin enclosure design to fit behind 208-230 VAC motor-driven appliances where space is not abundance. The placement of the two 208-230 VAC receptacles 42 and 43 on the side of the present invention 40 enables insertion of 208-230 VAC power cord plugs into 208-230 VAC receptacles 42 and 43 with minimum protrusion into the space behind the 208-230 VAC motor-driven appliance. FIG. 5C. is a right side view of the second embodiment of the present invention 40 depicting four prong 208-230 VAC receptacle 43 that characterize newer clothes dryers and four prong 208-230 VAC plug.

To understand the operation of the second embodiment of the present invention 40 please refer to FIG. 3 and FIGS. 5A, 5B, and 5C. Once the 208-230 VAC plug 46 of FIG. 5C. has been inserted into a 208-230 VAC wall receptacle and the mounting flange 44 has been securely attached to the wall with a suitable fastener inserted through hole 45, the four-prong 208-230 VAC power cord plug of a 208-230 VAC motor-driven appliance is inserted into one of the two side four prong 208-230 VAC receptacles 42 and 43 with the following results. First, the 208-230 VAC motor-driven appliance is electrically connected to 208-230 VAC power through the electrical conductors of the present invention 40 so that it may operate. Second, the 208-230 VAC motor-driven appliance is electrically connected in parallel with capacitance 25 of FIG. 3. pre-determined to have a capacitance value that substantially power factor corrects the 208-230 VAC motor-driven appliance. Preferably, the present invention 40 corrects the power factor of the 208-230 VAC motor-driven appliance to greater than, or equal to, 0.95. Third, the 208-230 VAC motor-driven appliance is electrically connected in series with reactor filter 29 of FIG. 3. predetermined to have an inductance value that substantially limits the inrush current of the 208-230 VAC motor-driven appliance. As a result, the 208-230 VAC motor-driven appliance electrically connected to the present invention 40 of FIGS. 5A, 5B, and 5C. consumes less electrical energy during start up and in steady-state operation which is the primary objective of the present invention 30.

The present invention also envisions third embodiment that is exactly the same as the second embodiment except that it is provided with a three prong 208-230 VAC plug and two side 208-230 VAC receptacles. The third embodiment of the present invention is not shown.

Figure 6B:
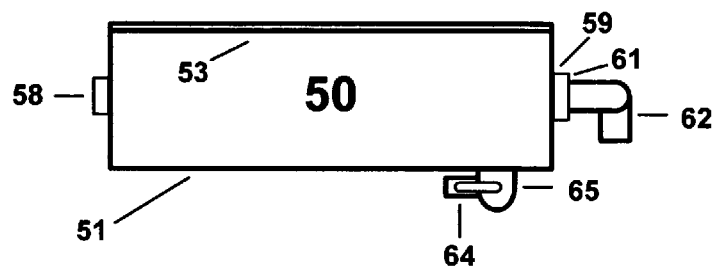
FIG. 6. is a front view orthogonal projection drawing of the fourth embodiment of the present invention that is intended to power factor correct "hard-wired" motor-driven appliances that are directly and permanently electrically connected to either 120 VAC or 208-230 VAC power in substantially dedicated circuits.
Figure 6A:
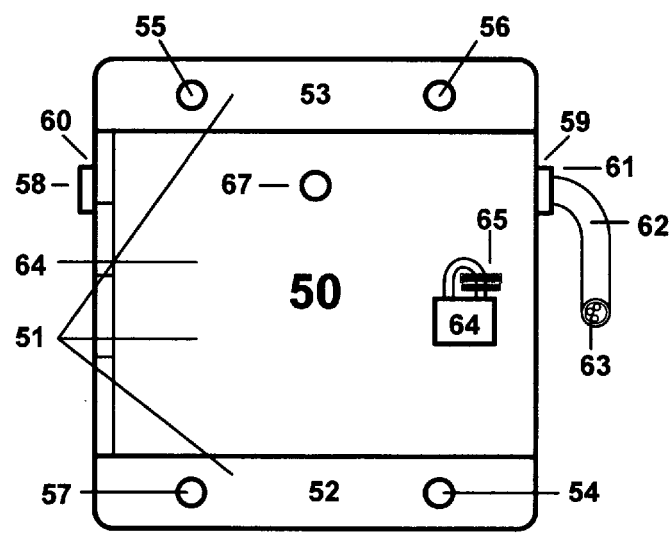
Figure 6C:
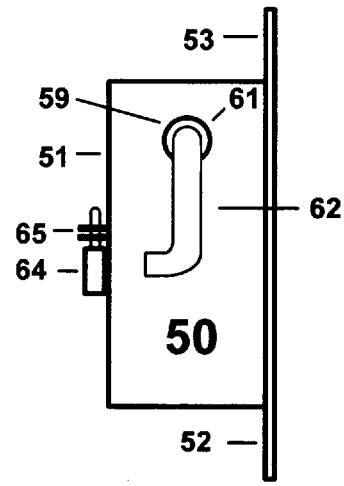

FIGS. 6A, 6B, and 6C, is a front view orthogonal projection of the fourth embodiment of the present invention 50 that is designed to reduce the electrical power consumption of hard-wired motor-driven appliances that are usually connected to 120 VAC or 208-230 VAC electrical power at the circuit breaker panel box of a structure such as houses, townhouses, condominiums, apartment buildings, churches, schools, small businesses, and the like. FIG. 6A is a front view of the fourth embodiment of the present invention 50 depicting a metal enclosure 51 that is specifically designed for outdoor deployment and exposure to sun, rain, snow, ice, and wind-blown dust. Furthermore, the enclosure 51 is provided with top and bottom mounting flanges, 52 and 53 respectively, and fastener holes 54, 55, 56, and 57, enabling it to be securely fastened to the exterior wall of a structure such as a house, townhouse, condominium, apartment building, church, school, small business, or the like, preferably in close proximity to the circuit breaker panel box (not shown). Enclosure 51 is provided with left and right holes 58 and 59, respectively, permitting the routing or electrical conductors into, and out of, enclosure 51. FIG. 6A. and 6B. depicts enclosure 51 with left hole 58 sealed by hole plug 60 while right hole 59 is provided with strain-relief 61 and flexible conduit 62 that shields and protects power conductors 63. Unauthorized access to the interior of enclosure 51 is controlled by lock 64 and brackets 65 prohibiting the opening of hinged door 66. Enclosure door 64 is provided with a visual alarm light 67, preferably at least one red LED, to indicate that the fourth embodiment of the present invention 50 is inoperative and should be replaced. FIG. 6B. is a top view of the fourth embodiment of the present invention 50 while FIG. 6C. is a right side view of the fourth embodiment of the present invention 50.

Figure 7:
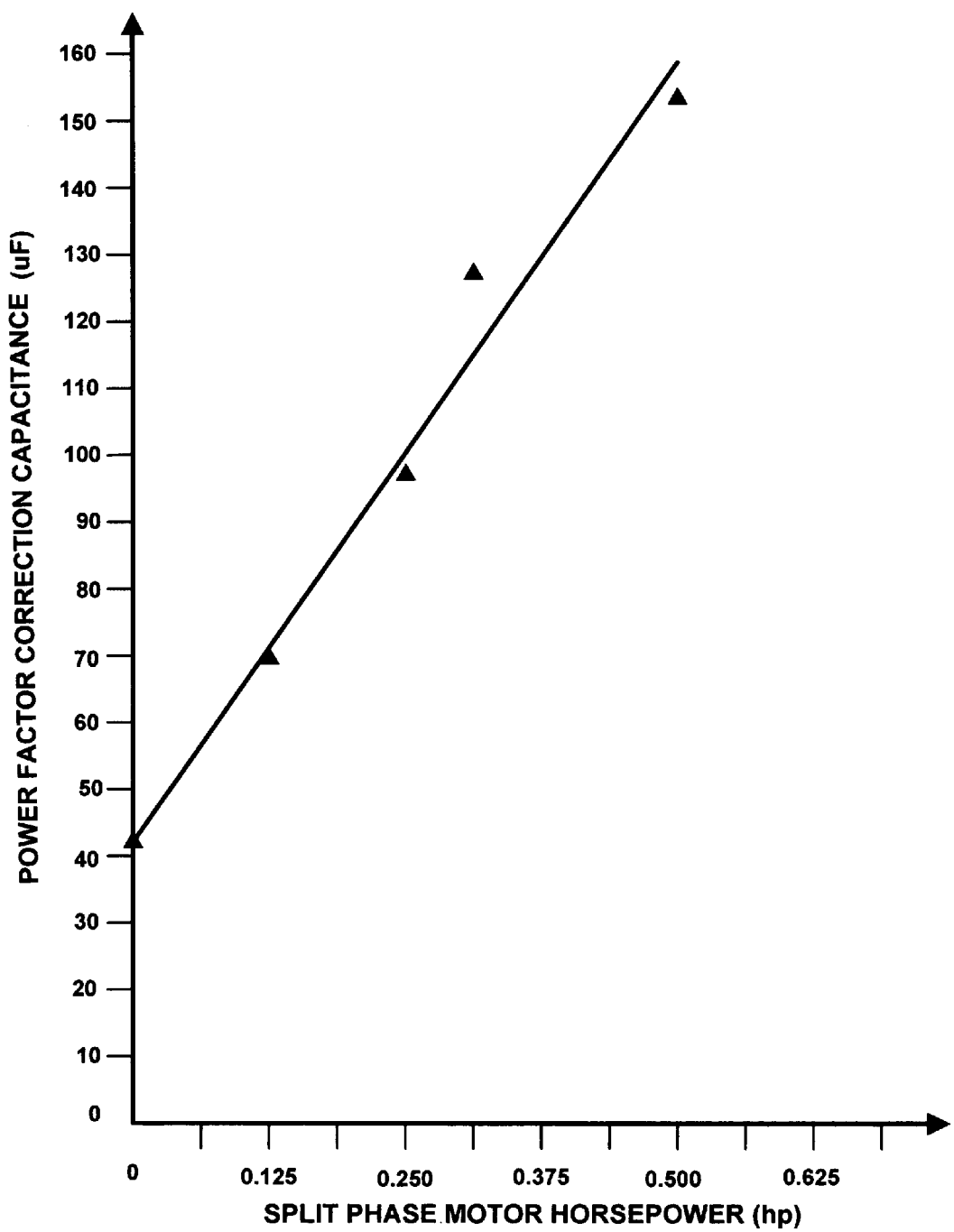
FIG. 7. is a graph that illustrates the relationship between power factor correction capacitance values and the horsepower of AC induction motors typically found in motor-driven appliances, the capacitance value having been predetermined to optimally power factor correct plug-in motor-driven appliances without the necessity of making preliminary power factor correction related electrical measurements.

FIG. 7., depicts a graph relating power factor correction capacitance values of the first or fourth embodiments of the present invention to the horsepower of AC induction motors likely to be found in 120 VAC motor-driven appliances that are plug-in or hard-wired, e.g. refrigerators, freezers, or furnace blowers. The graph depicted in FIG. 7. is crucial to the commercial success of the present invention because it enables the creation of an appliance type/motor type/motor horsepower-to-capacitance value database, that in turn, enables instances of the present invention to be mass produced in large numbers with a wide variety of capacitance values predetermined to optimally power factor correct specific, 120 VAC motor-driven appliances as have been mentioned above. As a result, consumers knowing only the appliance type, motor type, and motor horsepower of a specific 120 VAC motor-driven appliance can purchase instances of the present invention via mail-order or retail store outlets that are predetermined to optimally power factor correct specific 120 VAC motor-driven appliances without the necessity of performing preliminary power factor correction measurements.

Similarly, an appliance type/motor type/motor horsepower-to-inductance value database is crucial to the commercial success of the present invention because it enables instances of the present invention to be mass produced in large numbers with a wide variety of inductance values predetermined to optimally limit the inrush current of specific 120 VAC motor-driven appliances as mentioned above. As a result, consumers knowing only the appliance type, motor type, and motor horsepower, of a specific 120 VAC motor-driven appliance can purchase instances of the present invention via mail order or retail store outlets that are predetermined to optimally limit the inrush current of specific 120 VAC motor-driven appliances without the necessity of performing preliminary inrush current limiting measurements. Most importantly, preferably the present invention combines the two above mentioned databases into one database enabling the mass production of large numbers of instances of the present invention that simultaneously optimally power factor correct 120 VAC motor-driven appliances and optimally limit the inrush current of those same appliances. The graph relating appliance type, motor type, and motor horsepower-to-inductance value is not shown.

Figure 8:
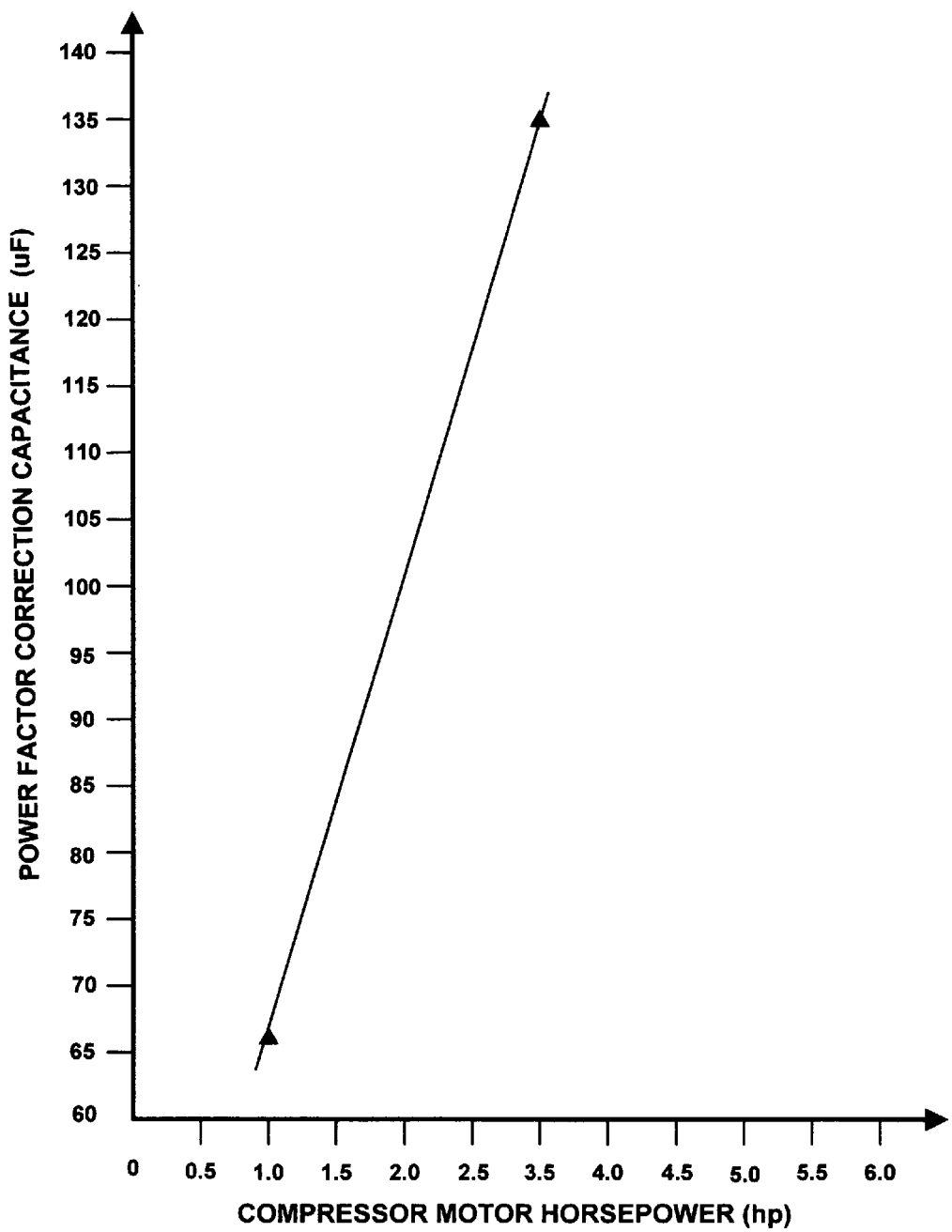
FIG. 8. is a graph that illustrates the relationship between power factor correction capacitance values and the horsepower of AC induction motors typically found in motor-driven appliances, the capacitance value having been predetermined to optimally power factor correct hard-wired motor-driven appliances without the necessity of making preliminary power factor related electrical measurements.

FIG. 8., depicts a graph relating power factor correction capacitance values of the second, third, or fourth embodiments of the present invention to the horsepower of AC induction motors likely to be found in 208-230 VAC motor-driven appliances that are plug-in or hard-wired, e.g. furnace blowers, central air conditioners, well-water pumps. The graph depicted in FIG. 8. is crucial to the commercial success of the present invention because it enables the creation of an appliance type/motor type/motor horsepower-to-capacitance value database, that in turn, enables instances of the present invention to be mass produced in large numbers with a wide variety of capacitance values predetermined to optimally power factor correct specific, 208-230 VAC motor-driven appliances as mentioned above. As a result, licensed electricians knowing only appliance type, motor type, and motor horsepower, can purchase instances of the present invention via mail order or retail store outlets that are predetermined to optimally power factor correct specific 208-230 VAC motor-driven appliances without the necessity of performing preliminary power factor correction measurements. The graph for inrush current is not shown.

Similarly, an appliance type, motor type, and motor horsepower-to-inductance value database is crucial to the commercial success of the present invention because it enables instances of the present invention to be mass produced in large numbers with a wide variety of inductance values predetermined to optimally limit the inrush current of specific 208-230 VAC motor-driven appliances as mentioned above. As a result, licensed electricians knowing only the appliance type, motor type, and motor horsepower, of a specific 208-230 VAC motor-driven appliance can purchase instances of the present invention via mail order or retail store outlets that are predetermined to optimally limit the inrush current of those same appliances. Most importantly, preferably the present invention combines the two above mentioned databases into one database enabling the mass production of large numbers of instances of the present invention that simultaneously optimally power factor correct 208-230 VAC motor-driven appliances and optimally limit the inrush current of those same appliances. The graph relating appliance type, motor type, and motor horsepower-to-inductance value is not shown.

Figure 9:
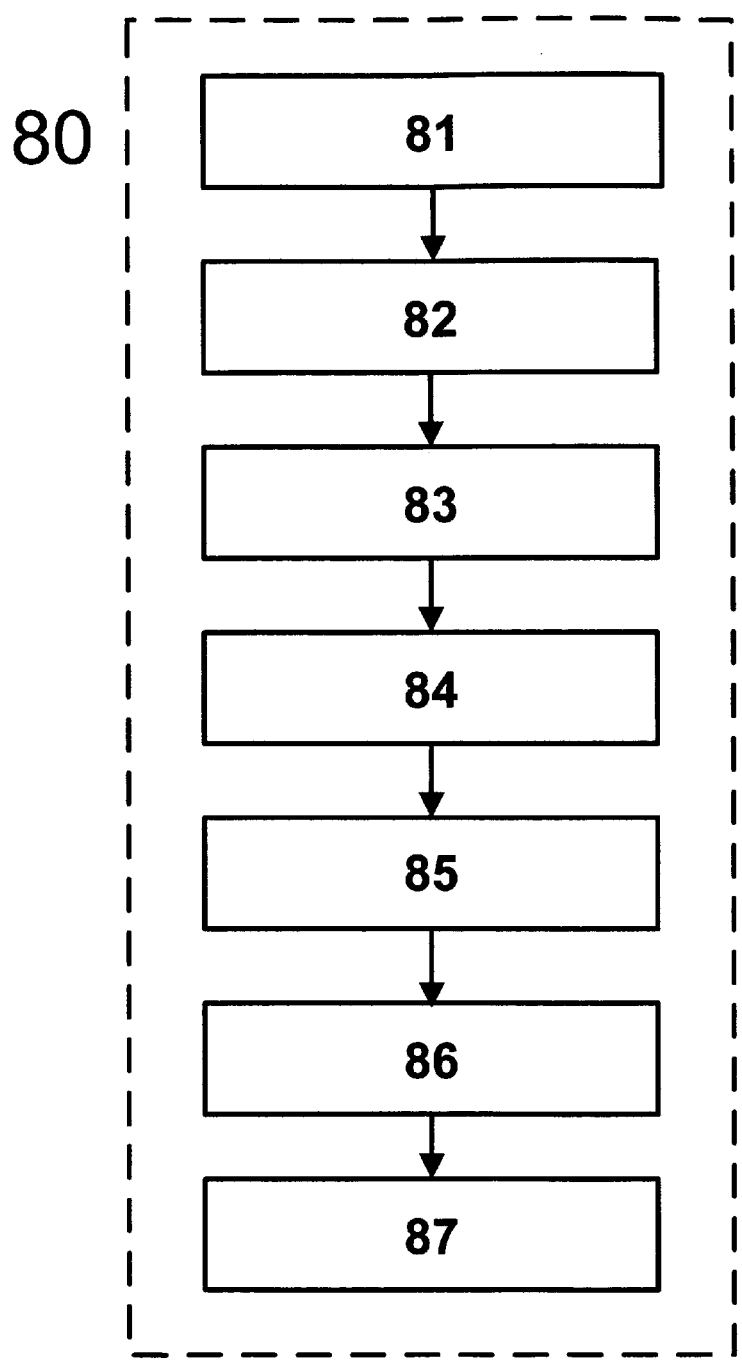
FIG. 9. is a Horsepower-to-Capacitance Database predicated sales process flow chart of the present invention illustrating how such a Horsepower-to-Capacitance Database eliminates the necessity of making preliminary power factor related electrical measurements making the commercial sale of large numbers of the present invention practical.

FIG. 9., depicts a sales process 80 that is predicated upon the above mentioned databases. The sales process 80 of the present invention begins with step 81 in which a consumer or licensed electrician determines the specific type of motor-driven appliance chosen to receive the energy saving benefits of the present invention, e.g. refrigerators, freezers, washing machines, central air conditioners, and furnace blowers.

In step 82 of the sales process 80 the consumer or licensed electrician locates the motor-driven appliance nameplate. Many motor-driven appliance manufacturers provide web pages that guide consumers in the location of the appliance nameplate. Such manufacturers provide consumers with user manuals complete with diagrams, illustrations, and instructions to facilitate location of the appliance's nameplate.

In step 83 of the sales process 80 the consumer or licensed electrician reads the motor horsepower from the nameplate. A motor-driven appliance may have multiple motors but the sales process 80 of the present invention concerned only with the largest or principal AC induction motor of the appliance.

In step 84 of the sales process 80 the consumer or licensed electrician selects the specific instance of the present invention, i.e. model, with a capacitance value that is predetermined to optimally power factor correct the specific motor-driven appliance under consideration.

In step 85 of the sales process 80 the consumer or licensed electrician verifies that the instance of the present invention, i.e. model, selected in step 84 has an inductance value that will optimally limit the inrush current of the specific motor-driven appliance under consideration. Preferably, for simplicity, the selection of the specific instance of the present invention, i.e. model, results in the default selection of a reactor filter inductance that optimally limits the inrush current of the motor-driven appliance under consideration.

In step 86 of sales process 80 consumers purchase the specific instance of the present invention, i.e. model, they previously selected from mail order or retail store outlets. In retail store outlets, consumers can select instances of the present invention on the basis of a list of compatible motor-driven appliances that may be printed on packaging and/or product displays just as consumers purchase computer printer cartridges on the basis of printer make and model.

In step 87 of sales process 80 licensed electricians purchase the specific instance of the present invention, i.e. model, they previously selected from mail order or retail store outlets. In retail store outlets, licensed electricians can select instances of the present invention on the basis of a list of compatible motor-driven appliances that may be printed on packaging and/or product displays just as consumers purchase computer printer cartridges on the basis of printer make and model.

It must be emphasized that the present invention can be advantageously applied to the 120 VAC and 208-230 VAC plug-in or hard-wired motor-driven appliances typically found in churches, food banks, schools, restaurants, bakeries, grocery stores, small businesses, and the like, as well as motor-driven appliances found in residential units such as houses, townhouses, apartments, and condominiums. While the preferred embodiments of the invention have been illustrated herein, it is to be understood that changes and variations may be made by those skilled in the art without departing from the spirit and scope of the appending claims.

We claim:
1. A method for substantially reducing the electrical power consumption of household or residential plug in or hard wired electric motor driven appliances comprising the steps of:
 a. Determining said electric motor driven appliance type, motor type, and motor horsepower of a wide variety of electric motor driven appliances, and
 b. Operating said electric motor driven appliances, and
 c. Measuring the voltage, operating current, inrush current, and power factor or real power, of said operating electric motor driven appliances, and
 d. Calculating the power factor correcting capacitance value from said voltage, operating current, inrush current, and power factor or real power measured values, that substantially power factor corrects said electric motor driven appliances, and
 e. Calculating the inrush current limiting inductance value from said voltage, operating current, inrush current, and power factor or real power measured values, that substantially limits said inrush current of said electric motor driven appliances, and
 f. Creating a first electric motor driven appliance type/motor type/horsepower to power factor correction capacitance value database that relates a specific type, or types, of electric motor driven appliances to a specific capacitance value or range of capacitance values that substantially corrects the power factor of said electric motor driven appliances, and
 g. Creating a second electric motor driven appliance type/motor type/motor horsepower to inrush current limiting inductance value database that relates a specific type, or types, of electric motor driven appliances to a specific inductance value or range of inductance values that substantially reduces or limits said inrush current of said electric motor driven appliances, and
 h. Utilizing said first database to select an appropriate capacitance value, or range of capacitance values, with which to make a power factor correction apparatus of a power saving apparatus of the present invention for specific said electric motor driven appliances, and
 i. Utilizing said second database to select an appropriate inductance value, or range of inductance values, with which to make an inrush current limiting apparatus of a power saving apparatus of the present invention for specific said electric motor driven appliances, and
 j. Making instances of said power factor correction apparatus of said power saving apparatus of the present invention for specific said electric motor driven appliances, and
 k. Making instances of said inrush current limiting apparatus of said power saving apparatus of the present invention for specific said electric motor driven appliances, and
 l. Publicizing said first and second databases to consumers, retail outlets, and licensed electricians, enabling the proper selection of instances of said power saving apparatus to substantially power factor correct, or power factor correct and inrush current limit, specific electric motor driven appliances, and
 m. Offering for sale instances of said power savings apparatus of the present invention, without the necessity of making preliminary power factor, or power factor and inrush current, related electrical measurements for each and every deployment of said power saving apparatus of the present invention.

2. A power saving apparatus for substantially reducing the electrical power consumption of said electric motor driven appliances comprising:
   a. An enclosure provided with mounting means for attachment to a surface in close proximity to said electric motor driven appliances or circuit breaker panel box, and
   b. At least one said power factor correction apparatus of claim 1, that is contained within said enclosure, and.

3. A power saving apparatus of claim 2, additionally comprising:
   a. At least one said inrush current limiting apparatus of claim 1, that is contained within said enclosure.

4. The power saving apparatus of claim 3, wherein said enclosure contains an overcurrent protection device that is electrically connected in series with said capacitance to open said power factor correction apparatus electrical conducting means thereby preventing excessively high electric current flow through said power saving apparatus and reducing the risk of fire.

5. The power saving apparatus of claim 4, wherein said enclosure is provided with a visual alarm light that illuminates when said overcurrent protection device opens said power factor correction apparatus electrical conducting means thereby providing a visual indication that said power factor correction apparatus is no longer operative.

6. The power saving apparatus of claim 4, wherein said enclosure is provided with an audible alarm annunciator that emits an audible sound alarm when said overcurrent protection device opens thereby providing an audible indication that said power factor correction apparatus is no longer operative.

7. The power saving apparatus of claim 6, wherein said enclosure is provided with a 120 volt alternating current electric conductor means and plug for insertion into a 120 volt alternating current household or building receptacle thereby connecting 120 volt alternating current power to at least one 120 volt alternating current receptacle disposed on an external surface of said enclosure and electrically connected to said capacitance such that insertion of a 120 volt alternating current power cord plug of a motor driven appliance into said power saving apparatus 120 volt alternating current receptacle establishes a parallel electrical connection with said capacitance and said electric motor driven appliance to substantially power factor correct or power factor correct and inrush current limit said motor driven appliance.

8. The power saving apparatus of claim 6, wherein said enclosure is provided with a three prong 208 to 230 volt alternating current electric conductor means and plug for insertion into a three prong 20 to 230 volt alternating current household or building receptacle thereby connecting 208 to 230 volt alternating current power to at least one three prong 208 to 230 volt alternating current receptacle disposed on an external surface of said enclosure and electrically connected to said capacitance such that insertion of a three prong 208 to 230 volt alternating current power cord plug of a motor driven appliance into said power saving apparatus 208 to 230 volt alternating current receptacle establishes a parallel electrical connection with said capacitance and said electric motor driven appliance to substantially power factor correct or power factor correct and inrush current limit said motor driven appliance.

9. The power saving apparatus of claim 6, wherein said enclosure is provided with a four prong 208 to 230 volt alternating current electric conductor means and plug for insertion into a four prong 20 to 230 volt alternating current household or building receptacle thereby connecting 208 to 230 volt alternating current power to at least one four prong 208 to 230 volt alternating current receptacle disposed on an external surface of said enclosure and electrically connected to said capacitance such that insertion of a four prong 208 to 230 volt alternating current power cord plug of a motor driven appliance into said power saving apparatus four prong 208 to 230 volt alternating current receptacle establishes a parallel electrical connection with said capacitance and said electric motor driven appliance to substantially power factor correct or power factor correct and inrush current limit said motor driven appliance.

10. The power saving apparatus of claim 6, wherein said enclosure is provided with a 120 volt alternating current electric power conductor means enabling the establishment of a hard wired electrical connection with a 120 volt alternating current electric power conductor means of a 120 volt alternating current motor driven appliance such that said power factor correcting capacitance is electrically connected in parallel with said 120 volt alternating current motor driven appliance and said inrush current limiting inductance is electrically connected in series with said 120 volt alternating current motor driven appliance, thereby substantially power factor correcting and inrush current limiting said 120 volt alternating current motor driven appliance.

11. The power saving apparatus of claim 10, wherein said enclosure is also provided with a 208 to 230 volt alternating current electric power conductor means enabling the establishment of a hard wired electrical connection with a 208 to 230 volt alternating current electric power conductor means of a 208 to 230 volt alternating current motor driven appliance such that said power factor correcting capacitance is electrically connected in parallel with said 208 to 230 volt alternating current motor driven appliance and said inrush current limiting inductance is electrically connected in series with said 208 to 230 volt alternating current motor driven appliance, thereby simultaneously and substantially power factor correcting and inrush current limiting both said 120 volt alternating current and said 208 to 230 volt motor driven appliances.

12. The power saving apparatus of claim 6, wherein said enclosure is provided with a 208 to 230 volt alternating current electric power conductor means enabling the establishment of a hard wired electrical connection with a 208 to 230 volt alternating current electric power conductor means of a 208 to 230 volt alternating current motor driven appliance such that said power factor correcting capacitance is electrically connected in parallel with said 208 to 230 volt alternating current motor driven appliance and said inrush current limiting inductance is electrically connected in series with said 208 to 230 volt alternating current motor driven appliance, thereby substantially power factor correcting and inrush current limiting said 208 to 230 volt alternating current motor driven appliance.

13. The power factor correction apparatus of claim 1, comprising:
   a. A capacitance with a capacitance value that was determined from said first database of claim 1, to substantially power factor correct said electric motor driven appliances, and
   b. An electrical conducting means that passes through said power saving apparatus enclosure to electrically connect said capacitance in parallel with an electrical conducting means that supplies electrical power to said electric motor driven appliances, whereby said power factor correcting capacitance substantially reduces the electrical power consumption of said electric motor driven appliances.

14. The inrush current limiting apparatus of claim 1, comprising:
   a. A reactor filter or inductance with an inductance value that was determined from said second database of claim 1, that substantially limits the inrush current of said electric motor driven appliances,
   b. An electrical conducting means that passes through said enclosure to electrically connect said inductance in series with an electrical conducing means that supplies electrical power to said electric motor driven appliances whereby said inrush current limiting inductance substantially reduces the electrical power consumption of said electric motor driven appliances.

* * * * *